(12) United States Patent
Ehrmann (10) Patent No.: US 12,084,106 B2
(45) Date of Patent: Sep. 10, 2024

(54) STEERING COLUMN FOR A VEHICLE

(71) Applicant: ZF Automotive Germany GmbH, Alfdorf (DE)

(72) Inventor: Lars Ehrmann, Cologne (DE)

(73) Assignee: ZF Automotive Germany GmbH, Alfdorf, NY (US)

( * ) Notice: Subject to any disclaimer, the term of this patent is extended or adjusted under 35 U.S.C. 154(b) by 0 days.

(21) Appl. No.: 18/183,424

(22) Filed: Mar. 14, 2023

(65) Prior Publication Data

US 2023/0294753 A1   Sep. 21, 2023

(30) Foreign Application Priority Data

Mar. 16, 2022   (DE) .................. 102022202602.0

(51) Int. Cl.
*B62D 1/185*   (2006.01)
*B62D 1/181*   (2006.01)
*F16C 29/04*   (2006.01)

(52) U.S. Cl.
CPC ............. *B62D 1/185* (2013.01); *B62D 1/181* (2013.01); *F16C 29/04* (2013.01)

(58) Field of Classification Search
CPC .......... B62D 1/185; B62D 1/181; F16C 29/04
See application file for complete search history.

(56) References Cited

U.S. PATENT DOCUMENTS

| | | | |
|---|---|---|---|
| 5,737,971 A | 4/1998 | Riefe et al. | |
| 10,888,158 B1 * | 1/2021 | Chen | A47B 88/473 |
| 2003/0209897 A1 | 11/2003 | Manwaring et al. | |
| 2006/0181069 A1 * | 8/2006 | Yamada | F16C 3/035 280/775 |
| 2017/0328400 A1 | 11/2017 | Muntener et al. | |
| 2021/0197882 A1 * | 7/2021 | Bayer | B62D 1/183 |
| 2022/0242474 A1 * | 8/2022 | Bayer | F16C 29/048 |

FOREIGN PATENT DOCUMENTS

| | | | | |
|---|---|---|---|---|
| CN | 116767334 A | * | 9/2023 | ............. B62D 1/181 |
| DE | 102019207525 A1 | | 11/2020 | |
| JP | 2005083532 A | * | 3/2005 | |
| WO | WO-2008013150 A1 | * | 1/2008 | ............. F16C 29/04 |
| WO | 2015018781 A1 | | 2/2015 | |

* cited by examiner

*Primary Examiner* — Drew J Brown
(74) *Attorney, Agent, or Firm* — Kristin L. Murphy (57) ABSTRACT

A steering column for a vehicle is disclosed, comprising at least one telescope-like portion and a carrier portion. The telescope-like portion is supported so as to be displaceable inside the carrier portion in the longitudinal direction of the telescope-like portion and has an adjustment device for telescopic adjustment of a length of the steering column by pushing the telescope-like portion in or out with respect to the carrier portion, and a ball bearing device between the telescope-like portion and the carrier portion. A running groove arrangement of the ball bearing device is formed with a linear running groove on the telescope-like portion and on the carrier portion and a plurality of balls are arranged between the running groove of the telescope-like portion and the running groove of the carrier portion. In order to improve rigidity and/or to achieve self-centering and/or to reduce friction between the balls and running grooves, the steering column, the ball bearing device has a plurality of running groove arrangements. The plurality of running groove arrangements are arranged in a state distributed about a longitudinal center axis of the steering column.

20 Claims, 8 Drawing Sheets

STEERING COLUMN FOR A VEHICLE

CROSS-REFERENCE TO RELATED APPLICATION

This application claims priority to German Priority Application No. 102022202602.0, filed Mar. 16, 2022, the disclosure of which is incorporated herein by reference in its entirety.

TECHNICAL FIELD

The disclosure relates to a steering column for a vehicle having at least one telescope-like portion and having a carrier portion, wherein the telescope-like portion is supported so as to be able to be displaced inside the carrier portion in the longitudinal direction of the telescope-like portion, and having an adjustment device for telescopic adjustment of a length of the steering column by pushing the telescope-like portion in or out with respect to the carrier portion, and having a ball bearing device between the telescope-like portion and the carrier portion, wherein a running groove arrangement of the ball bearing device is formed with a linear running groove on the telescope-like portion and on the carrier portion, respectively, and a plurality of balls are arranged between the running groove of the telescope-like portion and the running groove of the carrier portion.

BACKGROUND

Such a steering column is known from DE 10 2012 101 900 A1. Accordingly, a linear ball bearing arrangement allows for a play-free support of the telescope-like portion in the carrier portion or a guide pipe in a cover pipe is formed. The running grooves or running tracks are formed by linear, substantially prismatic impressions in the guide pipe and in the cover pipe. A ball cage may be provided for the balls.

However, how the prismatic impressions and consequently the running grooves are constructed is unclear. In addition, it is disadvantageous that by incorporation of this ball bearing arrangement, radial forces for play-free support are introduced only locally or at one side. In this manner, there is the risk of a non-uniform force distribution and/or a non-centered guiding.

SUMMARY

What is needed is to develop a steering column of the type mentioned in the introduction in such a manner that a rigidity is improved and/or a self-centering is achieved and/or a friction between balls and running grooves is reduced.

A steering column according to the disclosure is constructed for a vehicle, such as a motor vehicle. In one exemplary arrangement, the steering column is a displaceable or adjustable steering column. The steering column has at least one telescope-like portion and a carrier portion. The telescope-like portion and/or the carrier portion may be constructed in a tubular manner. The telescope-like portion is supported inside the carrier portion so as to be able to be displaced in the longitudinal direction of the telescope-like portion and/or the carrier portion. In this instance, an adjustment device serves to telescopically adjust a length of the steering column by pushing the telescope-like portion in or out with respect to the carrier portion. The carrier portion is secured to a vehicle, a vehicle frame and/or a control panel unit.

The steering column may have a steering wheel. In this instance, the term "steering wheel" is synonymous with a steering handle of any shape and/or form. To allow for adaptation to a seating position or body size of a driver, motor vehicles are generally provided with an adjustable steering wheel or with an adjustable steering column. Adjustable steering wheels or steering columns may in this instance be adjusted backward and forward with respect to the steering wheel height and/or along the steering column axis. The driver can consequently move the steering wheel in such adjustable steering columns into a height and/or spacing position, with respect to the upper body, which is comfortable for him/her. Prior to the adjustment, the adjustment device can be released by a steering wheel lock and, after steering wheel adjustment is complete, can be locked again, in order to prevent an undesirable independent adjustment of the steering wheel position under all generally occurring conditions or forces. Alternatively or additionally, an adjustable steering wheel or an adjustable steering column can be used for space-saving storage of the steering wheel, for example in an idle state of the vehicle and/or in autonomous driving mode.

A ball bearing device is formed between the telescope-like portion and the carrier portion. In this instance, a running groove arrangement of the ball bearing device having a linear running groove is formed on the telescope-like portion and on the carrier portion, respectively. In one exemplary arrangement, the running groove arrangement is formed from a running groove pair. In one exemplary arrangement, in order to form the running groove arrangement or the running groove pair, a first running groove is formed on the carrier portion and a second running groove is formed on the telescope-like portion. In one exemplary arrangement, the two running grooves of the running groove arrangement are arranged facing each other and/or opposite each other in order to form a channel for balls of the ball bearing device. The two running grooves of the running groove arrangement may be arranged and/or formed in a mirror-symmetrical manner with respect to each other.

The ball bearing device has a plurality of balls. In one exemplary arrangement, the plurality of balls are associated with the running groove arrangement or the running groove arrangement has the plurality of balls. The balls are arranged between the running groove of the telescope-like portion and the running groove of the carrier portion. The friction between the carrier portion and the telescope-like portion during a telescope-like movement can thereby be reduced.

According to the disclosure, the ball bearing device has a plurality of running groove arrangements, wherein the plurality of running groove arrangements are arranged in a state distributed about a longitudinal center axis of the steering column.

In this instance, it is advantageous that, as a result of the plurality of running groove arrangements which are distributed about the longitudinal center axis of the steering column and which have a plurality of balls in each case, improved properties of the steering column can be produced. For example, as a result of the plurality of running groove arrangements, an improved guiding of the telescope-like portion in the carrier portion, a more uniform load distribution and/or an improved rigidity, such as torsion rigidity, are achieved. As a result of the plurality of running groove arrangements, a plurality of running grooves can consequently be formed in a circumferential direction or around the longitudinal center axis in each case on the telescope-like portion and on the carrier portion.

According to another exemplary arrangement, the plurality of running groove arrangements are distributed in a uniform manner about the longitudinal center axis of the steering column. For example, the plurality of running grooves are constructed in a state distributed in a uniform manner in a circumferential direction of the telescope-like portion and the carrier portion. In one exemplary arrangement, the ball bearing device has at least three, four, five or six running groove arrangements. As a result of the uniform distribution of the plurality of running groove arrangements about the longitudinal center axis of the steering column, there is produced a uniform distribution of the forces which occur or act. In one exemplary arrangement, better rigidity and/or torsion rigidity of the steering column can be achieved. For example, the running groove arrangements and/or the running grooves extend parallel with the longitudinal center axis of the steering column. The plurality of running groove arrangements, in order to form the ball bearing device, are each arranged or constructed with the same radius with respect to the longitudinal center axis.

In one exemplary arrangement, a plurality of balls are arranged in a linear manner one behind the other in a running groove arrangement in each case. In this instance, two, three, four, five, six or more balls are each arranged in a running groove arrangement with spacing from each other. Due to the spacing of the balls, it is ensured that the balls do not roll on one another in opposing directions during the telescope-like action. The spacings between directly adjacent balls may be identical. Alternatively, however, it is also conceivable for the spacings between directly adjacent balls to be different. Furthermore, it is alternatively conceivable for at least two or more groups of balls to be arranged in a running groove arrangement in each case. In this instance, directly adjacent balls within a group may be spaced apart with a first spacing from each other in each case, whilst an additional spacing is produced between two adjacent groups of balls. In one exemplary arrangement, the first spacing is smaller than the additional spacing.

In one exemplary arrangement, the ball bearing device or the running groove arrangement has a ball cage in which the balls are rotatably supported. Due to the ball cage, the plurality of balls may be supported in a manner spaced apart from each other. For example, due to a ball cage, a linear ball chain for a running groove arrangement is formed in each case. The arrangement of the plurality of balls in a ball cage further considerably simplifies the assembly. The ball cage may with respect to the longitudinal center axis of the steering column fix or determine a minimum radial spacing between the carrier portion and the telescope-like portion. The ball cage may abut the carrier portion and/or the telescope-like portion. In one exemplary arrangement, the carrier portion and the telescope-like portion are spaced apart from each other by the ball bearing device and/or by the ball cage, for example in a radial direction with respect to the longitudinal center axis of the steering column.

According to a development, at least one of the running grooves has a gothic profile. Due to the gothic profile, at least one point contact or a line contact, for example, a plurality of point contacts or line contacts, is/are produced between balls in the ball bearing device and the running groove with the gothic profile. Due to the gothic profile of the at least one running groove and the point contact or linear contact which is produced thereby, the plurality of point contacts or plurality of line contacts between the ball and the gothic profile of the running groove, a reduction of the friction between the ball and running groove can be achieved in a defined manner. In one exemplary arrangement, due to the point contact or the line contact, for example the plurality of point contacts or plurality of line contacts, advantageous running properties or telescope-like properties are produced between the running groove and balls with an improved guiding of the telescope-like portion in the carrier portion, with uniform load distribution and/or improved rigidity.

With a line contact, the running groove may have a running face and/or osculation which is adapted to the ball surface of the ball. For example, the adapted running face and/or osculation of the running groove is produced at right-angles with respect to a longitudinal axis of the running groove. Due to the line contact or the plurality of line contacts, the load-bearing capacity can be increased.

In one exemplary arrangement, the gothic profile is in the form of a gothic pointed arch profile or can alternatively be referred to as a gothic pointed arch profile. In one exemplary arrangement, the gothic profile is produced in the cross section of the running groove.

In one exemplary arrangement, the gothic profile and/or the cross section of the running groove is produced at right-angles with respect to a longitudinal axis of the running groove. For example, the gothic profile may better balance production-related fluctuations of the running groove geometry. In addition, the shaping as a gothic profile enables lubricant to be stored in a simple manner.

In one exemplary arrangement, the running grooves of the telescope-like portion and the carrier portion each have a gothic profile. Point contacts or line contacts are thereby exclusively produced between the balls in the ball bearing device and the respective running groove. Between a ball of the ball bearing device and the two running grooves of the associated running groove arrangement, a four-point contact or a four-line contact is produced. In one exemplary arrangement, between a ball and the running groove of the carrier portion, on the one hand, and between the associated running groove of the telescope-like portion, on the other hand, a two-point contact or two-line contact is produced in each case. The gothic profile or the point contacts between the running groove and the balls lead to improved running properties with precise guiding, uniform load distribution and a high level of rigidity.

According to another exemplary arrangement, the ball bearing device is under pretensioning or is mounted with a pretensioning. For example, the balls in the ball bearing device have a negative operating play with respect to the running grooves of the associated running groove arrangement. As a result of the negative operating play, the components, such as the carrier portion and the telescope-like portion, are tensioned and/or centered with respect to each other. As a result of the negative operating play of the ball bearing device or the balls, a complex manual adjustment of a friction and/or pretensioning in the context of the assembly can be dispensed with. In one exemplary arrangement, the balls and/or the running grooves have a resilience in order to balance and/or absorb the negative operating play.

In one exemplary arrangement, in order to adjust a predetermined pretensioning of the ball bearing device, the balls are selected from a specific ball class. In this instance, balls which differ from each other are grouped into several ball classes. The balls of the different ball classes may differ from each other as a result of different diameters of the balls. For example, the selection of the ball class is carried out in accordance with a specific dimension of the telescope-like portion and/or the carrier portion. It is thereby possible to adjust a friction or pretensioning of the ball bearing device in accordance with a dimensional accuracy of the telescope-like portion and/or the carrier portion in a predetermined manner.

According to one exemplary development, an air space or a lubricant reservoir is formed between the running groove and the respective ball. For example, the air space or the lubricant reservoir is formed between a tip of the gothic profile of the running groove and the ball. In one exemplary arrangement, the tip of the gothic profile determines a maximum depth of the running groove.

In one exemplary arrangement, a groove-like recess is formed in the region of the tip of the gothic profile. The groove-like recess may extend in the longitudinal direction of the running groove. The air space or the lubricant reservoir is increased by the groove-like recess. In one exemplary arrangement, the groove-like recess determines a maximum depth of the running groove.

According to another exemplary arrangement, a first telescope-like portion is displaceably supported inside the carrier portion in the longitudinal direction of the carrier portion, wherein another telescope-like portion is displaceably supported inside the first telescope-like portion in the longitudinal direction of the first telescope-like portion. In this instance, a first ball bearing device is arranged between the first telescope-like portion and the carrier portion and another ball bearing device is arranged between the first telescope-like portion and the additional telescope-like portion. In one exemplary arrangement, using the adjustment device, the length of the steering column can be adjusted by pushing in or pushing out the first telescope-like portion and the additional telescope-like portion. In this instance, the first telescope-like portion and the additional telescope-like portion can be pushed in or pushed out one after the other or at the same time. The additional ball bearing device between the first telescope-like portion and the additional telescope-like portion can be constructed or developed in accordance with or in a similar manner to the above-described ball bearing device between the carrier portion and the first telescope-like portion. In this regard, in order to prevent repetition, reference may also be made to the above description.

In one exemplary arrangement, linear running grooves of the first ball bearing device are formed in each case at an inner side of the carrier portion and at an outer side of the first telescope-like portion and linear running grooves of the additional ball bearing device are formed in each case at an inner side of the first telescope-like portion and at an outer side of the additional telescope-like portion. Consequently, on the one hand, a plurality of running groove arrangements may be formed between the carrier portion and the first telescope-like portion and a plurality of running groove arrangements may be formed between the first telescope-like portion and the additional telescope-like portion.

The carrier portion, the first telescope-like portion and/or the additional telescope-like portion may be made from a metal, including, but not limited to, steel or aluminum.

BRIEF DESCRIPTION OF DRAWINGS

The disclosure will be explained in greater detail below with reference to the Figures. In this instance, the same reference numerals refer to components or elements which are identical, similar or functionally identical. In the drawings.

DETAILED DESCRIPTION

Figure 1:
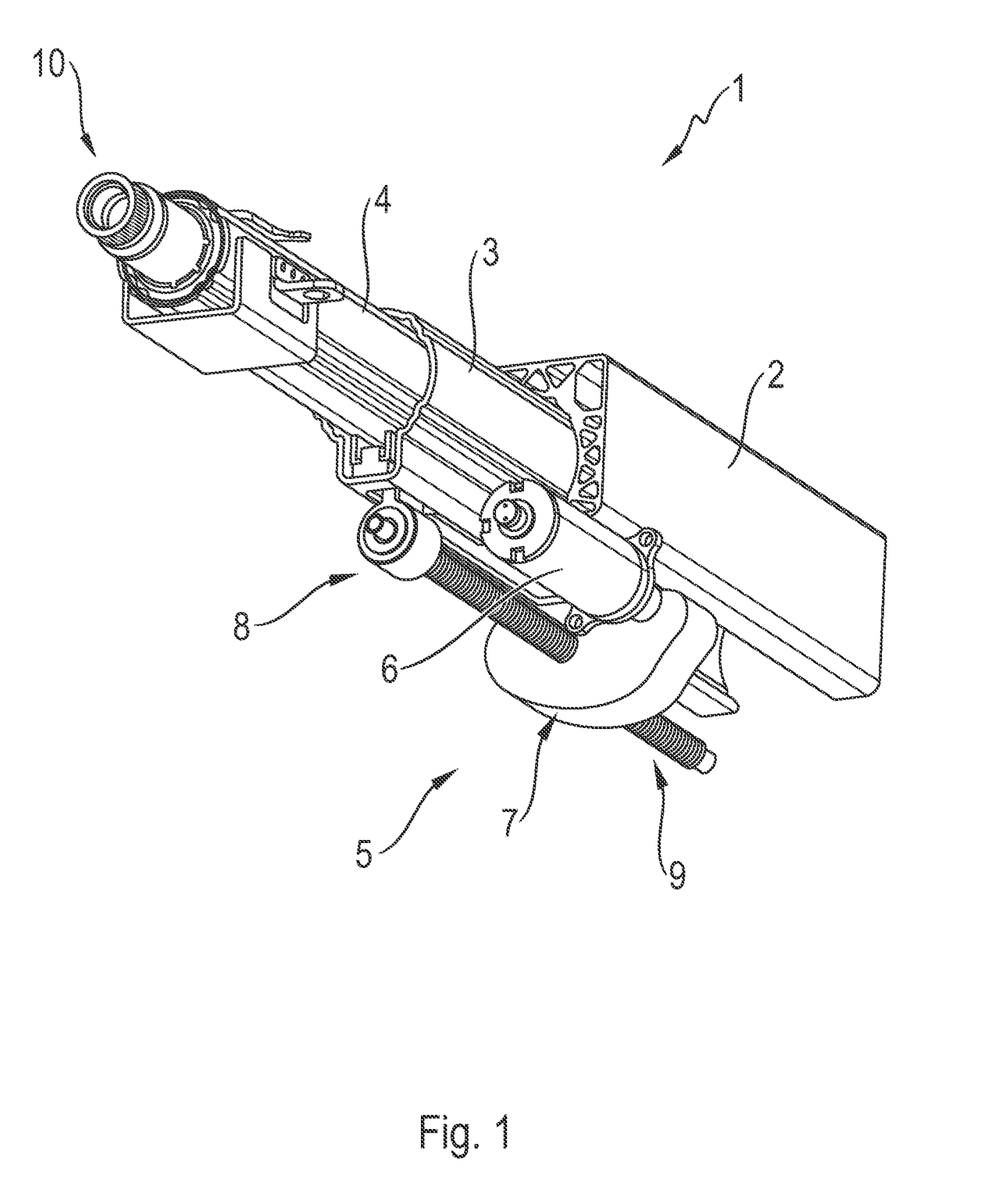
FIG. 1 shows a perspective side view of a first steering column according to the disclosure.

FIG. 1 shows a perspective side view of a first steering column 1 according to the disclosure. The steering column 1 has a carrier portion 2. In this exemplary arrangement, a first telescope-like portion 3 is arranged or displaceably supported inside the carrier portion 2 and in the longitudinal direction of the carrier portion 2. Furthermore, in this exemplary arrangement another telescope-like portion 4 is arranged or displaceably supported inside the first telescope-like portion 3 in the longitudinal direction of the first telescope-like portion 4.

The steering column 1 has an adjustment device 5. Using the adjustment device 5, a length of the steering column 1 can be adjusted in a telescopic manner. To this end, the first telescope-like portion 3 can be pushed in or pushed out with respect to the carrier portion 2 and the other telescope-like portion 4 can be pushed in or pushed out with respect to the first telescope-like portion 3. In this exemplary arrangement, the adjustment device 5 has a motor 6. In this instance, the motor 6 is connected by way of example by a transmission 7, which is only schematically indicated, and via spindle devices 8, 9 to the carrier portion 2, the first telescope-like portion 3 and the additional telescope-like portion 4 in order to move the steering column 1 in a telescope-like manner.

In a mounted state, not illustrated in greater detail here, in a vehicle, the carrier portion 2 is secured to the vehicle or a vehicle frame. A steering wheel which is not illustrated in greater detail here may be arranged at an end 10 of the additional telescope-like portion 4 facing away from the carrier portion 2.

Figure 2:
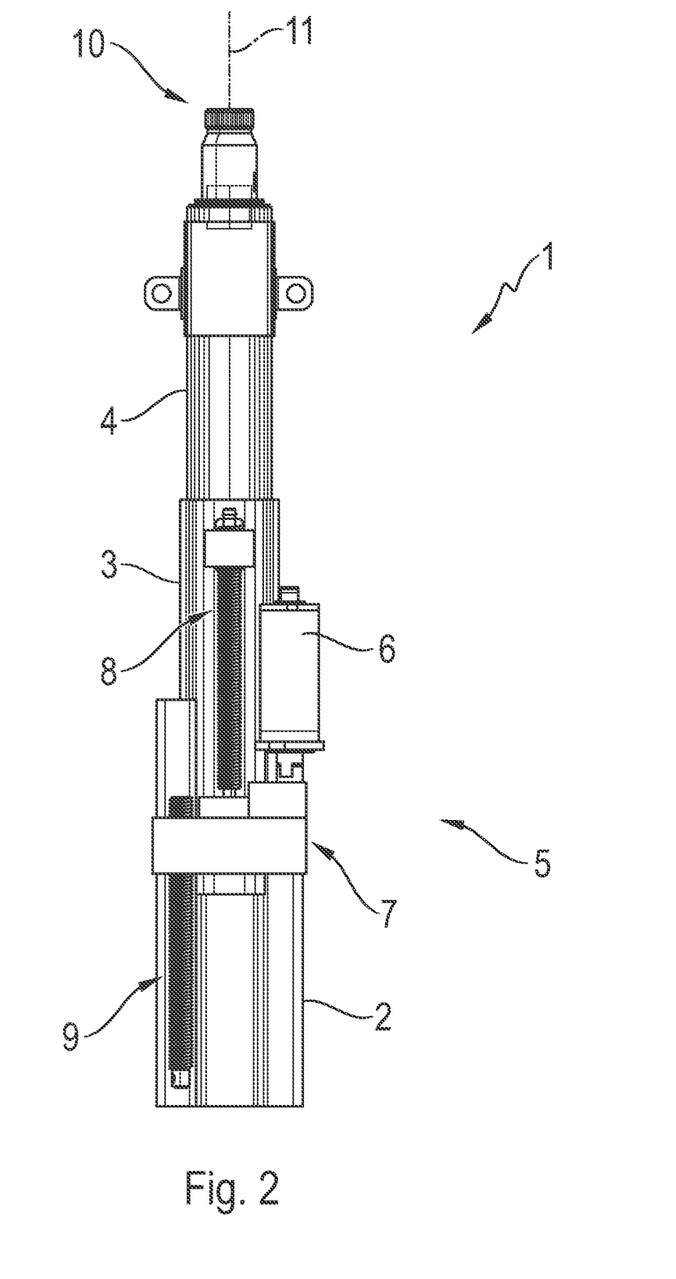
FIG. 2 shows a side view of the first steering column according to the disclosure according to FIG. 1.

FIG. 2 shows a side view of the first steering column 1 according to the disclosure according to FIG. 1. According to this illustration, the steering column 1 is in an approximately maximum extended state. In order to move the steering column 1 in a telescope-like manner, the first telescope-like portion 3 and the additional telescope-like portion 4 can be pushed in or pushed out with respect to the carrier portion 2 and in the longitudinal direction of a longitudinal center axis 11 of the steering column 1.

Figure 3:
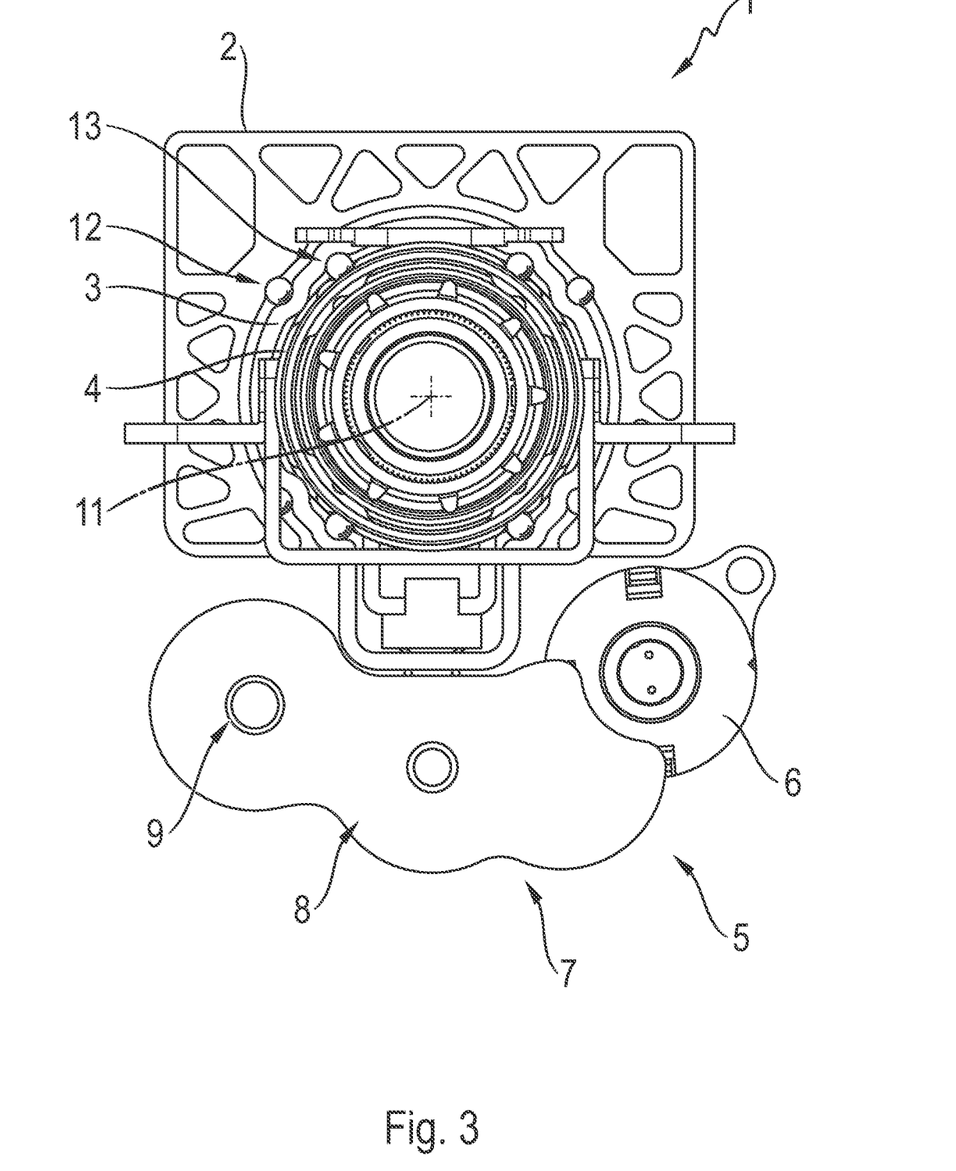
FIG. 3 shows a front view of the first steering column according to the disclosure according to FIGS. 1 and 2.

FIG. 3 shows a front view of the first steering column 1 according to the disclosure according to FIGS. 1 and 2. A first ball bearing device 12 is formed between the first telescope-like portion 3 and the carrier portion 2. An additional ball bearing device 13 is formed between the first telescope-like portion 3 and the additional telescope-like portion 4. The formation of the ball bearing devices 12, 13 is explained in greater detail with reference to the following Figures.

Figure 4:
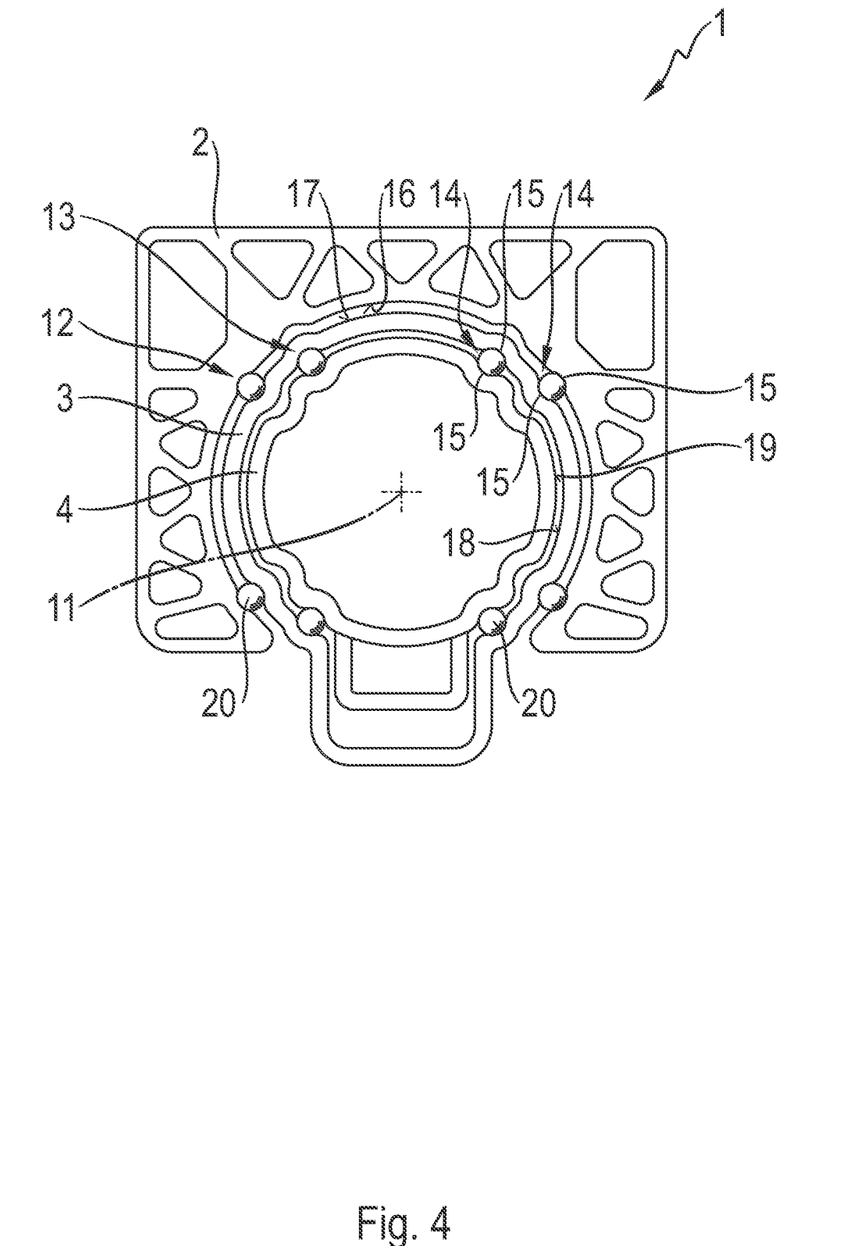
FIG. 4 shows a front view of the first steering column according to the disclosure according to FIG. 3, with individual components being omitted.

FIG. 4 shows a front view of the first steering column 1 according to the disclosure according to FIG. 3 with individual components being omitted for the sake of greater clarity.

The two ball bearing devices 12, 13 each have a plurality of running groove arrangements 14. In this exemplary arrangement, the two ball bearing devices 12, 13 each have four running groove arrangements 14. Each running groove arrangement 14 is in each case formed by two running grooves 15. For greater clarity, not all of the running groove arrangements 14 and running grooves 15 are provided with a reference numeral.

In order to form the running groove arrangement 14 for the first ball bearing device 12, a running groove 15 is formed in each case on an inner side 16 of the carrier portion 2 and on an outer side 17 of the first telescope-like portion 3. The running groove arrangements 14 of the additional ball bearing device 13 are in each case formed by a linear running groove 15 on an inner side 18 of the first telescope-like portion 3 and on an outer side 19 of the additional telescope-like portion 4. In each running groove arrangement 14, a plurality of balls 20 are arranged in each case between or in the two running grooves 15 of the respective running groove arrangement 14.

In this exemplary arrangement, the running groove arrangements 14 are arranged or constructed in a state distributed in a uniform manner about the longitudinal center axis 11 of the steering axle 1. The running grooves 15 extend parallel with the longitudinal center axis 11 and are in this exemplary arrangement in the form of impressions in the inner sides 16, 18 or in the outer sides 17, 19.

In this exemplary arrangement, the steering column 1 or the ball bearing devices 12, 13 are under pretensioning in a radial direction with respect to the longitudinal center axis 11. This pretensioning is produced as a result of a negative operating play between the running grooves 15 and the balls 20 of the running groove arrangements 14.

Figure 5:
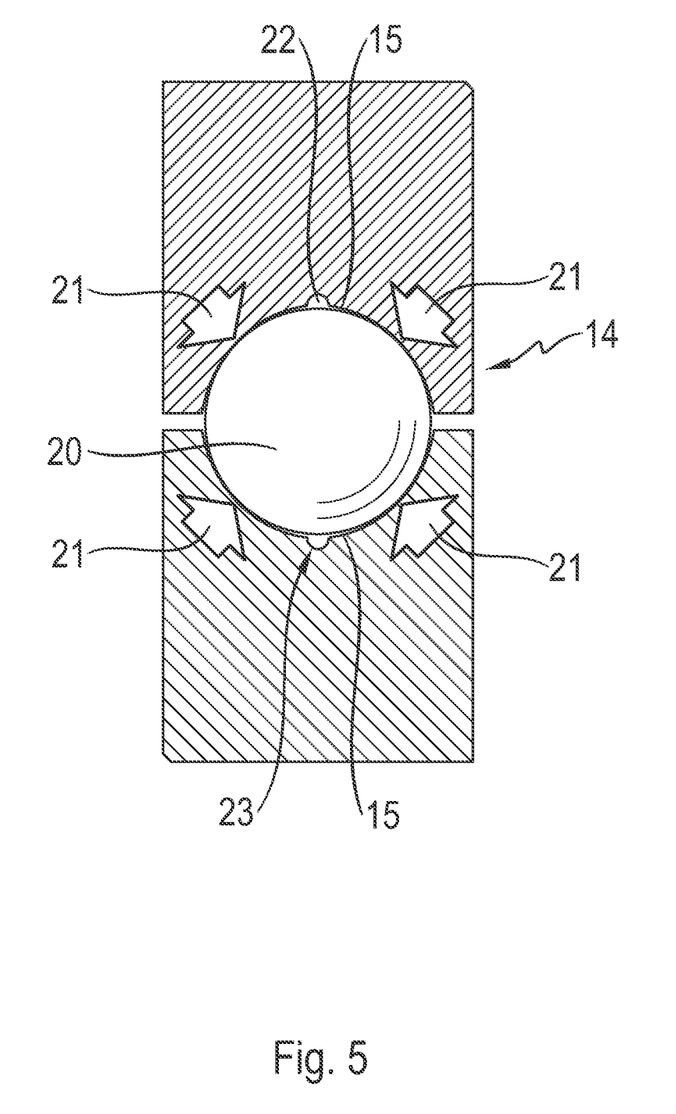
FIG. 5 shows a schematic cut-out of a front view of an arrangement of a ball between two running grooves for the steering column according to the disclosure according to FIGS. 1 to 4.

FIG. 5 shows a schematic cut-out of a front view of an arrangement of a ball 20 between two running grooves 15 of a running groove arrangement 14 for the steering column 1 according to the disclosure according to FIGS. 1 to 4. The running grooves 15 each have a gothic profile. In this exemplary arrangement, the running grooves 15 each have a running face or osculation which is adapted to the ball surface of the ball 20, whereby a line contact between the ball 20 and the running grooves 15 is produced in the region of the arrows 21. Between each ball 20 of the ball bearing devices 12,13 and the two running grooves 15 of the associated running groove arrangement 14 there is consequently in this example a four-line contact. In this instance a two-line contact between the ball 20 and the respective running groove 15 is produced for each running groove 15. Alternatively, such a formation of the gothic profile may be produced so that the balls 20 abut the linear running grooves 15 only by point contacts.

Between a tip of the gothic profile of the running groove 15 and the ball 20 there is formed an air space 22 which can act as a lubricant reservoir. Furthermore, in this exemplary arrangement in the region of the tip of the gothic profile a groove-like recess 23 is additionally formed. The groove-like recess 23 extends in the longitudinal direction of the respective running groove 15. Due to the groove-like recess 23, the air space 22 or a lubricant reservoir which is formed thereby is increased. The groove-like recess 23 additionally determines a maximum depth of the running groove 15.

Figure 6:
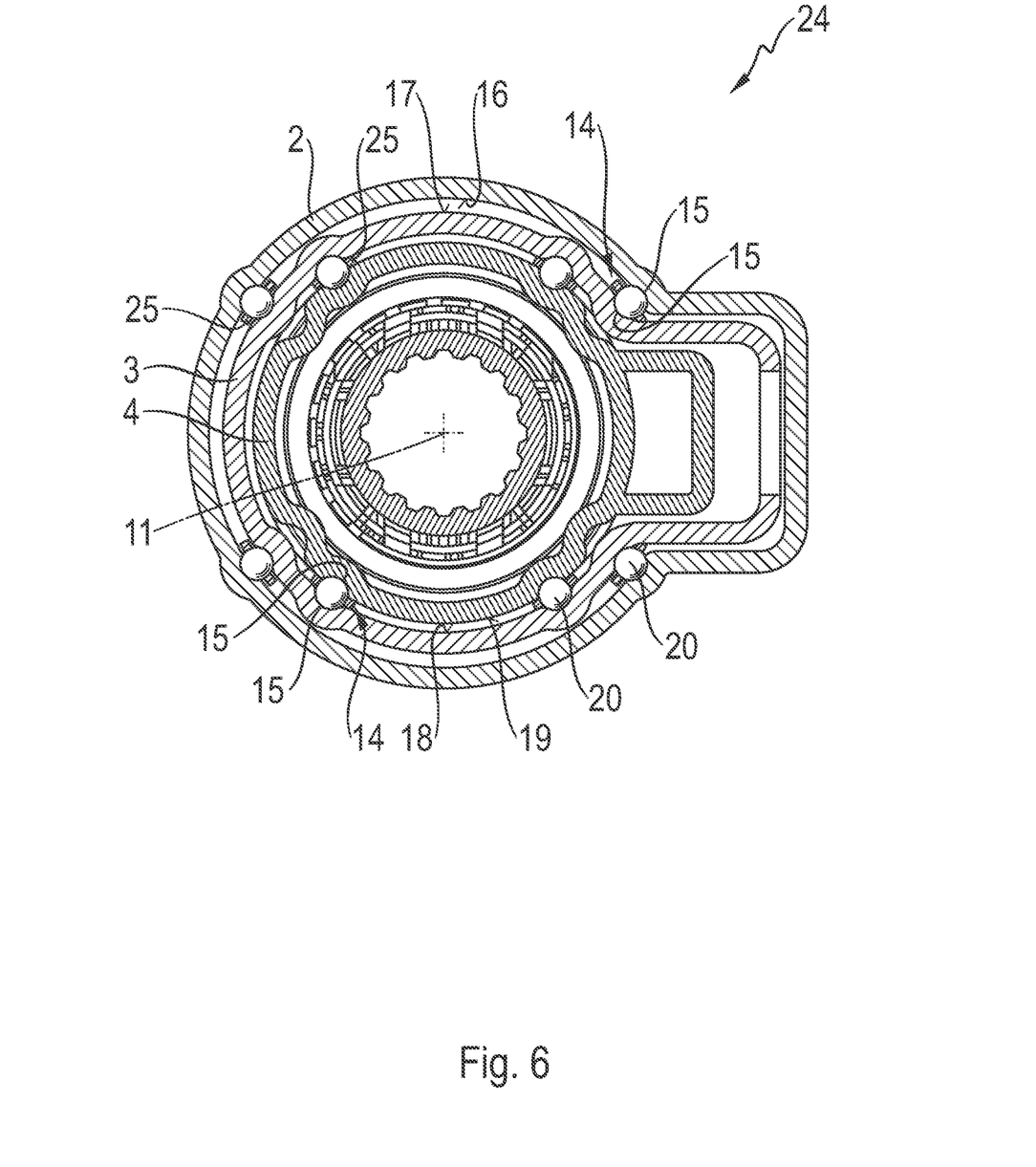
FIG. 6 shows a sectioned front view of another steering column according to the disclosure.

FIG. 6 shows a sectioned front view of another steering column 24 according to the disclosure. The basic structure and the function of the additional steering column 24 substantially corresponds to the steering column 1 according to FIGS. 1 to 5. The same features have the same reference numerals as before. In this regard, reference may also be made to the previous description in order to avoid repetition.

In this exemplary arrangement, the running groove arrangements 14 of the ball bearing devices 12, 13 each have a ball cage 25. The running groove arrangements 14 of the steering column 1 according to FIGS. 1 to 5 may also have such a ball cage 25.

The ball cages 25 of the first ball bearing device 12 are arranged between the inner side 16 of the carrier portion 2 and the outer side 17 of the first telescope-like portion 3. The ball cages 25 of the additional ball bearing device 13 are arranged between the inner side 18 of the first telescope-like portion 3 and the outer side 19 of the additional telescope-like portion 4.

Figure 7:
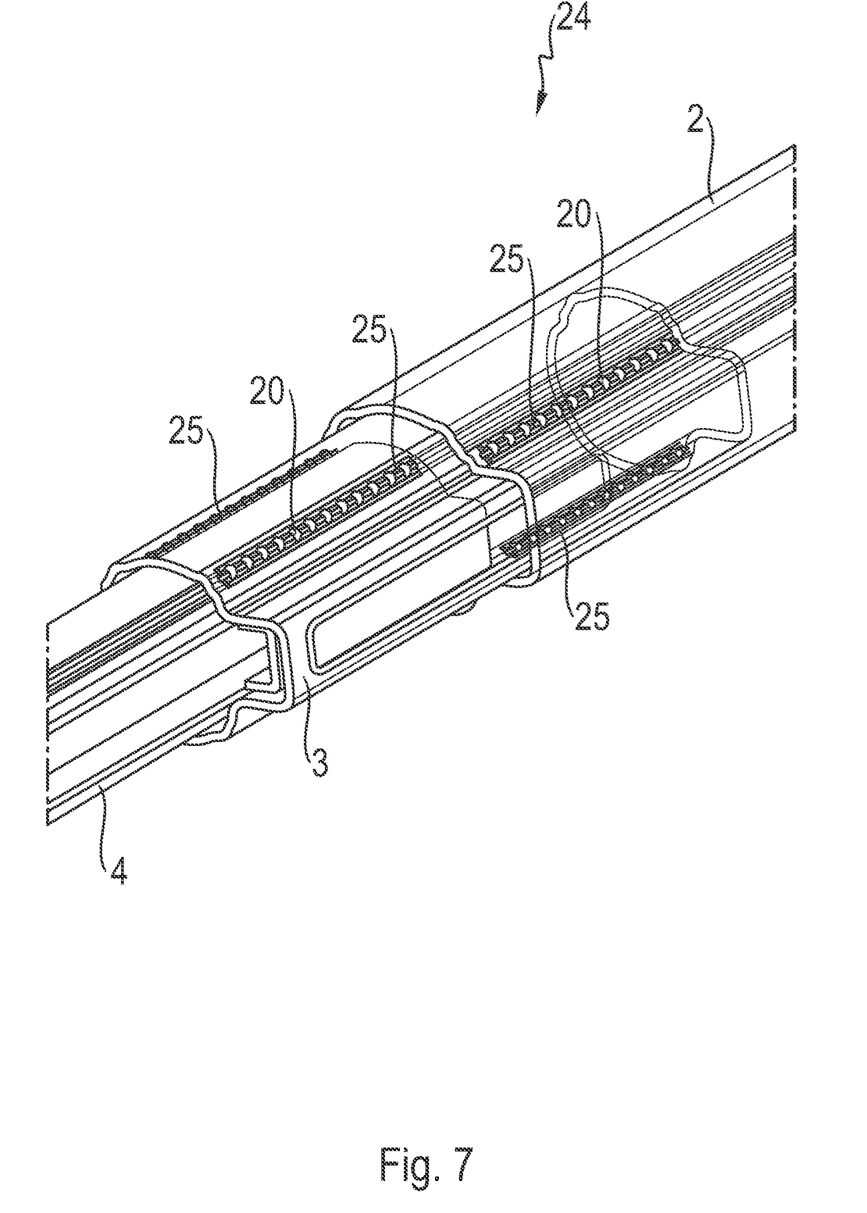
FIG. 7 shows a cut-out of a partially-transparent side view of the additional steering column according to the disclosure according to FIG. 6.

FIG. 7 shows a cut-out of a partially transparent side view of the additional steering column 24 according to the disclosure according to FIG. 6. It can be seen that for each running groove arrangement 14 according to FIG. 6 a plurality of balls 20 are arranged in a ball cage 25 in a linear manner one behind the other and with spacing from each other. For the purposes of greater clarity, not all the balls 20 are provided with a reference numeral. As a result of the spacing of the balls 20 from each other, the balls 20 are prevented from rolling on each other in opposing directions when the steering column 24 is moved in a telescope-like manner. As a result of the ball cage 25, a type of ball chain which additionally simplifies the assembly of the balls 20 is formed.

Figure 8:
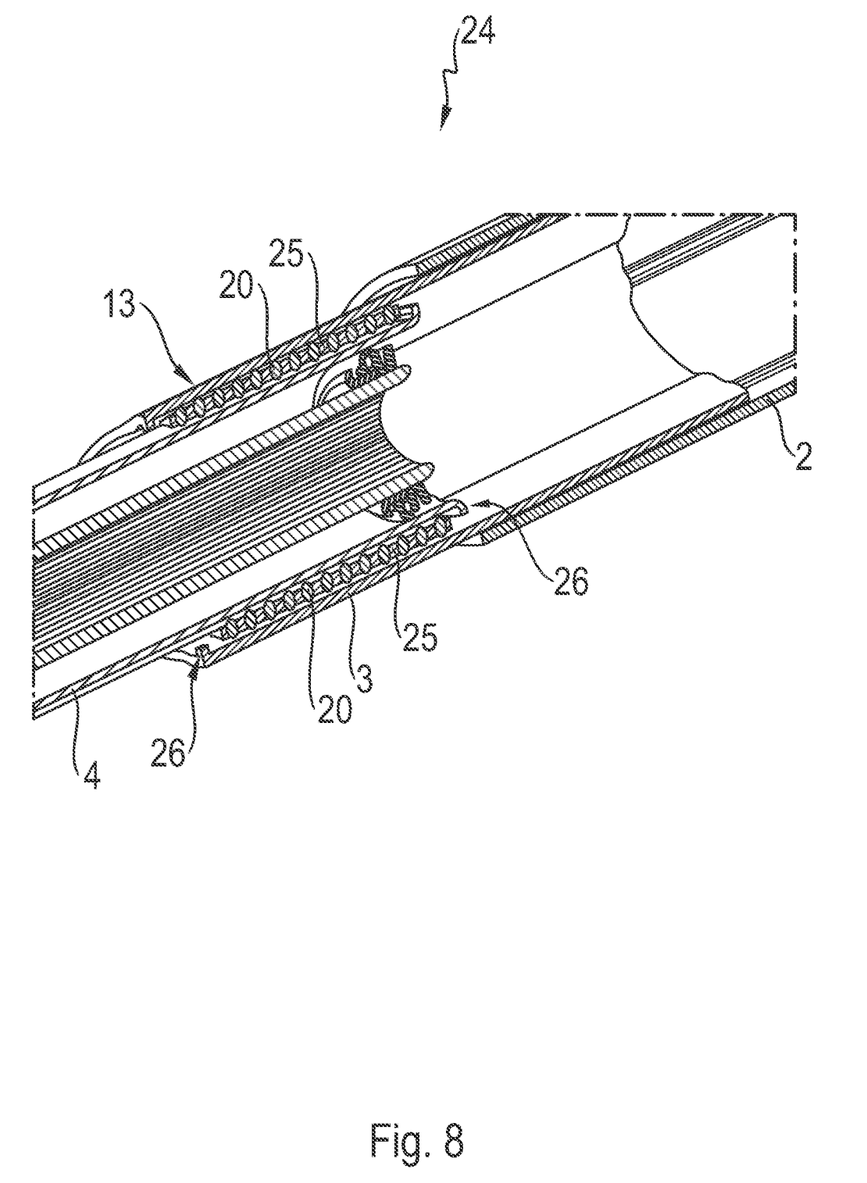
FIG. 8 shows a cut-out of a sectioned side view of the additional steering column according to the disclosure according to FIGS. 6 and 7.

FIG. 8 shows a cut-out of a sectioned side view of the additional steering column 24 according to the disclosure according to FIGS. 6 and 7. In this instance, for example, sectioned ball cages 25 of the additional ball bearing device 13 can be seen. The two telescope-like portions 3, 4 have in each case stops 26 at the ends thereof according to this exemplary arrangement. The stops 26 prevent the balls 20 or the ball cage 25 from moving out of an overlapping region between the two telescope-like portions 3, 4 in an undesirable manner. Corresponding stops 26 can also be provided in the first telescope-like portion 3 and the carrier portion 2 with respect to the first ball bearing device 12 and the balls 20 at that location or the ball cages 25 at that location.

The invention claimed is:

1. A steering column for a vehicle, comprising:
   a carrier portion;
   a first telescopic portion supported so as to be displaceable inside the carrier portion in a longitudinal direction of the carrier portion;
   a second telescopic portion supported so as to be displaceable inside the first telescopic portion in a longitudinal direction of the first telescopic portion;
   an adjustment device for telescopic adjustment of a length of the steering column by pushing the first telescopic portion in or out with respect to the carrier portion and by pushing the second telescopic portion in or out with respect to the first telescopic portion;
   a first ball bearing device between the first telescopic portion and the carrier portion, wherein a first running groove arrangement of the first ball bearing device is formed with a linear first running groove on the first telescopic portion and a linear first running groove on the carrier portion and a plurality of balls are arranged between the first running groove of the first telescopic portion and the first running groove of the carrier portion, wherein the first ball bearing device has a plurality of first running groove arrangements, wherein the plurality of first running groove arrangements are arranged in a state distributed about a longitudinal center axis of the steering column; and a second ball bearing device between the first and second telescopic portions, wherein a second running groove arrangement of the second ball bearing device is formed with a linear second running groove on the first telescopic portion and a linear second running groove on the second telescopic portion and a plurality of balls are arranged between the second running groove of the first telescopic portion and the second running groove of the second telescopic portion, wherein the second ball bearing device has a plurality of second running groove arrangements, wherein the plurality of second running groove arrangements are arranged in a state distributed about the longitudinal center axis of the steering column, and wherein each of the balls of the second ball bearing device are completely circumferentially offset from each of the balls of the first ball bearing device.

2. The steering column as claimed in claim 1, wherein each of the plurality of first running groove arrangements and the plurality of second running groove arrangements are distributed in a uniform manner about the longitudinal center axis.

3. The steering column as claimed in claim 2, wherein the first ball bearing device has at least three first running groove arrangements and the second ball bearing device has at least three first running groove arrangements.

4. The steering column as claimed in claim 2, wherein the first running groove arrangements and/or the first running grooves extend parallel with the longitudinal center axis of the steering column.

5. The steering column as claimed in claim 2, wherein at least one of the first running grooves has a gothic profile and at least one point contact or a line contact-between balls of the first ball bearing device and the first running groove with the gothic profile.

6. The steering column as claimed in claim 1, wherein the plurality of balls of the first ball bearing device are arranged in a linear manner in the first running groove arrangement, wherein two or more balls are arranged in each case in a first running groove arrangement with spacing from each other.

7. The steering column as claimed in claim 6, wherein the first ball bearing device or the first running groove arrangement has a ball cage in which the balls of the first ball bearing device are rotatably supported.

8. The steering column as claimed in claim 1, wherein at least one of the first running grooves has a gothic profile and at least one point contact or a line contact between balls of the first ball bearing device and the first running groove with the gothic profile.

9. The steering column as claimed in claim 8, wherein the first running grooves of the telescopic portion and the carrier portion each have a gothic profile and point contacts or line contacts are exclusively produced between balls of the first ball bearing device and the respective first running groove.

10. The steering column as claimed in claim 9, wherein a four-point contact or a four-line contact is produced in each case between a ball of the first ball bearing device and the two first running grooves of the associated first running groove arrangement.

11. The steering column as claimed in claim 8, wherein an air space or a lubricant reservoir is formed between the first running groove and the respective ball.

12. The steering column as claimed in claim 11, wherein the air space or the lubricant reservoir is formed between a tip of the gothic profile and the ball and wherein the tip of the gothic profile determines a maximum depth of the first running groove.

13. The steering column as claimed in claim 12, wherein a recess is formed in a region of the tip of the gothic profile, wherein the air space or the lubricant reservoir is increased by the recess, and wherein the recess determines a maximum depth of the first running groove.

14. The steering column as claimed in claim 1, wherein the first ball bearing device is mounted with a pretensioning, such that the balls of the first ball bearing device have a negative operating play with respect to the first running grooves of the associated first running groove arrangement.

15. The steering column as claimed in claim 14, wherein, in order to adjust a predetermined pretensioning of the first ball bearing device, the balls of the first ball bearing device are selected from a specific ball class, wherein the balls of the first ball bearing device which differ from each other are grouped into several ball classes, such that the selection of the ball class is carried out in accordance with a specific dimension of the first telescopic portion and/or the carrier portion.

16. The steering column as claimed in claim 15, wherein the balls of different ball classes differ from each other as a result of differing diameters of the balls.

17. The steering column as claimed in claim 14, wherein the balls of the first ball bearing device and/or the first running grooves have a resilience in order to balance and/or absorb the negative operating play.

18. The steering column as claimed in claim 1, wherein linear first running grooves of the first ball bearing device are formed in each case at an inner side of the carrier portion and at an outer side of the first telescopic portion and linear second running grooves of the second ball bearing device are formed in each case at an inner side of the first telescopic portion and at an outer side of the second telescopic portion.

19. The steering column as claimed in claim 18, wherein each first running groove of the first telescopic portion forms a running projection at an inner side of the first telescopic portion, each of the running projections extending toward an associated third running groove of the second telescopic portion, the third running grooves being formed at the outer side of the second telescopic portion.

20. The steering column as claimed in claim 18, wherein each second running groove of the first telescopic portion forms a running projection at the outer side of the first telescopic portion, each of the running projections extending toward an associated third running groove of the carrier portion, the third running grooves being formed at the inner side of the carrier portion.

* * * * *